United States Patent [19]
Huntt

[11] Patent Number: 5,177,893
[45] Date of Patent: Jan. 12, 1993

[54] MITT FOR SPINNING FISHING REEL

[76] Inventor: Robert L. Huntt, 10420 Watkins Rd., Germantown, Md. 20874

[21] Appl. No.: 727,807

[22] Filed: Jul. 8, 1991

[51] Int. Cl.⁵ .............................................. A01K 97/00
[52] U.S. Cl. ....................................... 43/25; 2/161 A
[58] Field of Search ...................... 43/25, 26; 2/161 A, 2/17

[56] References Cited
U.S. PATENT DOCUMENTS

| | | | |
|---|---|---|---|
| 571,020 | 11/1896 | Royce | 2/17 |
| 2,997,043 | 8/1961 | Mitchell | 43/25 |
| 4,727,675 | 3/1988 | Huntt | 43/25 |
| 4,805,338 | 2/1989 | Schuldom | 43/25 |

FOREIGN PATENT DOCUMENTS

| | | | |
|---|---|---|---|
| 2382 | of 1897 | United Kingdom | 2/17 |
| 27861 | 11/1986 | United Kingdom | 2/17 |

Primary Examiner—Richard K. Seidel
Assistant Examiner—Jeanne M. Elpel
Attorney, Agent, or Firm—Lowe, Price, LeBlanc & Becker

[57] ABSTRACT

A mitt for keeping a hand of a fisher warm while fishing with a rod and spinning reel having a bale includes a shell and a slide fastener closure for the shell for selectively opening and cosing the shell. The shell, when closed by the closure, has a size and shape to encircle the hand. The shell includes openings for receiving (a) the rod so that opposite portions of the rod extend from opposite portions of the shell with a segment of the rod between the opposite portions being within the shell at a position to be gripped by the hand enclosed by the closed shell and (b) a strut connected to the segment and the reel so that the reel is outside of the closed shell. The shell includes a finger positioned and constructed to (a) receive and enclose a digit of the hand while the hand is enclosed by the closed shell at the position where the hand grips the rod segment and (b) enable the fisher's digit therein to manipulate the bale.

12 Claims, 3 Drawing Sheets

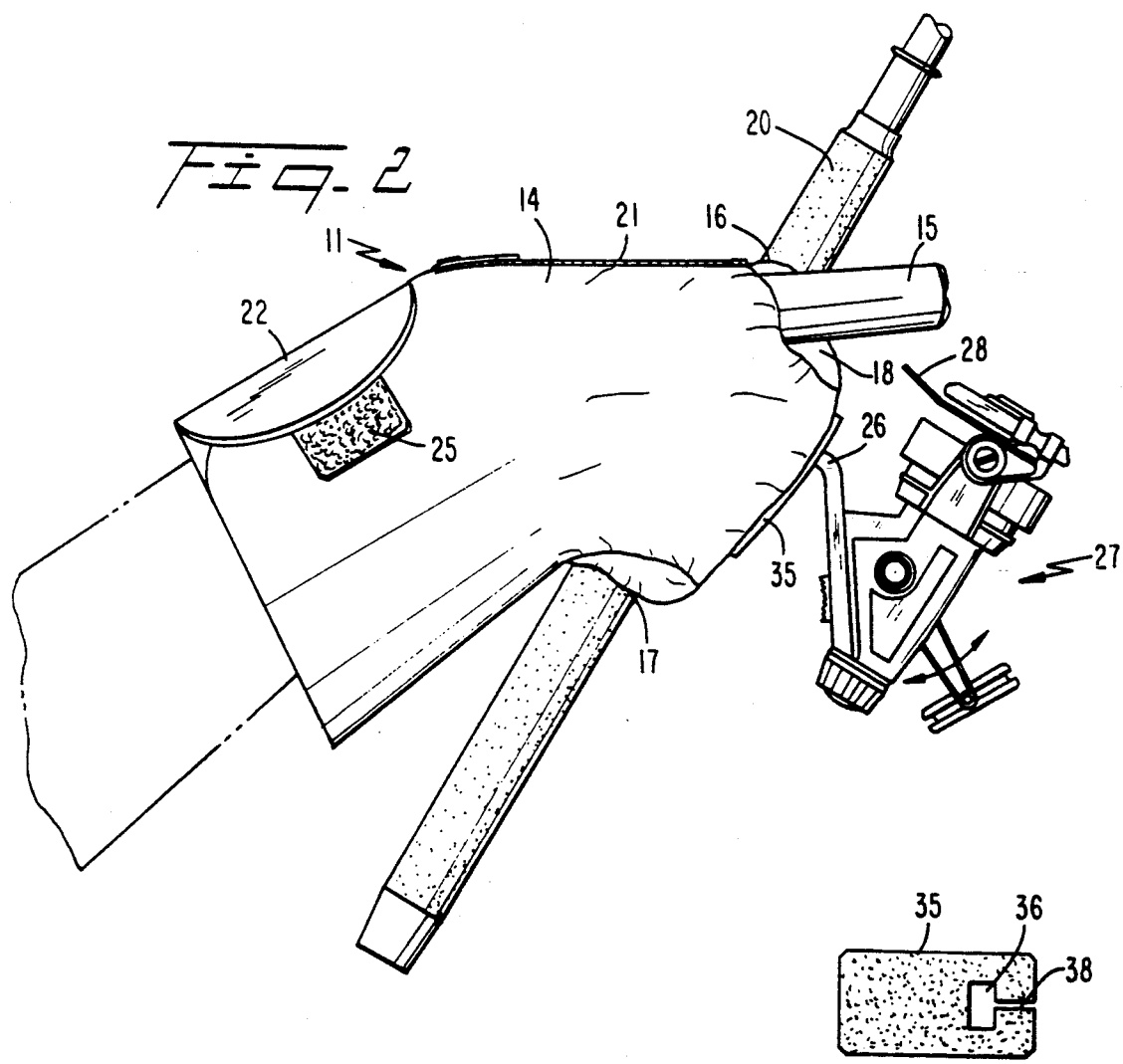
Fig. 2
Fig. 2A
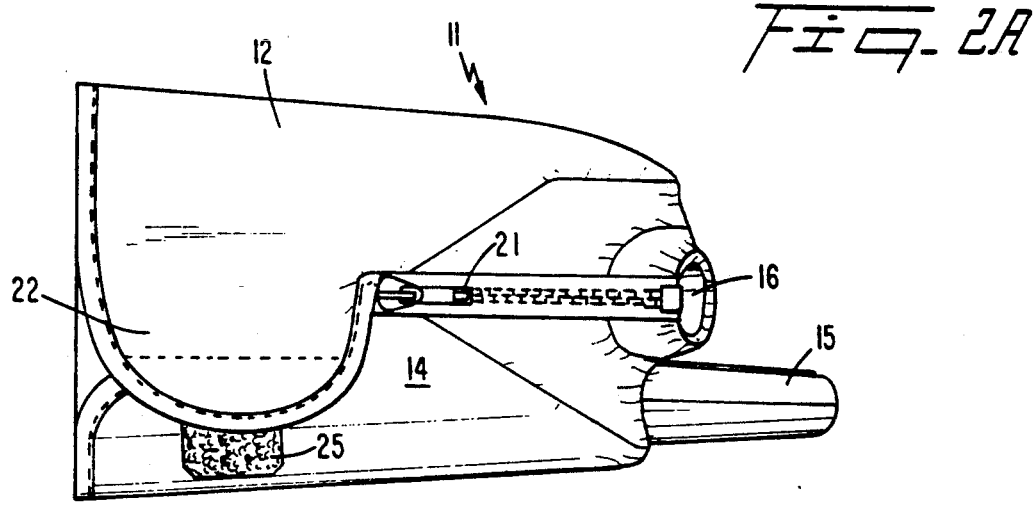
Fig. 3

MITT FOR SPINNING FISHING REEL

FIELD OF INVENTION

The present invention relates generally to a mitt for keeping a hand of a fisher warm while fishing with a rod and spinning reel having a bale, and more particularly, to such a mitt including a finger positioned and constructed to (a) receive and enclose a digit of the hand while the hand is enclosed by a closed thermally insulated shell of the mitt at a position where the hand grips a handle of the rod and (b) enable the digit in the finger to manipulate the bale.

BACKGROUND ART

Experienced fishers have long been aware of the advantages of cool and cold weather fishing. However, cool and cold weather fishing is accompanied by the discomfort of cold hands for the fisher. Experienced fishers have generally disdained from the use of conventional gloves during cool or cold weather fishing because conventional gloves prevent the fisher from achieving maximum sensitivity to tugs on a rod or line by a fish. Experienced fishers find that maximum results are achieved if one of their hands has direct contact with the rod and/or line. Such direct contact cannot be achieved with conventional gloves or mitts.

To overcome these problems, I previously invented a mitt for rods having casting reels. This mitt, disclosed in my U.S. Pat. No. 4,727,675, includes a thermally insulated shell in which the hand of the fisher and the casting reel and a handle portion of the rod are completely enclosed. The casting rod and fishing line from the reel extend through apertures in the shell.

While this prior art structure is quite satisfactory for rods including casting reels, it cannot function as a mitt for keeping the hand of a fisher warm while the fisher is fishing with a rod and spinning reel having a bale. The bale must be manipulated by a digit of the hand gripping the rod. The reel is too cumbersome to be located in the mitt and hand-eye coordination is frequently important in manipulating the bale. If the bale were in the mitt such coordination could not be attained. In addition, it is not feasible for the fishing line from the spinning reel to be within the mitt confines.

It is, accordingly, an object of the present invention to provide a new and improved mitt for keeping the hand of a fisher warm while fishing with a rod and spinning reel having a bale.

It is another object of the present invention to provide a new and improved mitt for keeping the hand of a fisher warm while fishing with a rod and spinning reel having a bale, wherein the mitt enables the bale and fishing line, both of which are outside of the mitt, to be manipulated from within the mitt by a digit of the fisher.

It is an additional object of the present invention to provide a new and improved mitt for keeping the hand of a fisher warm while fishing with a rod and spinning reel having a bale wherein the hand of the fisher directly grasps the rod, to maximize the sensitivity of the fisher to tugs by prey that are coupled from the line to the rod, while enabling a digit of a hand of the fisher to manipulate the bale and line, even though the bale and line are outside of the mitt.

The Invention

In accordance with a preferred embodiment of the present invention, a mitt for keeping the hand of a fisher warm while fishing with a rod and spinning reel having a bale comprises a thermally insulated shell including a closure means for selectively opening and closing the shell. The shell, while closed by the closure means, has a size and shape to encircle the hand. The shell includes openings for receiving (a) the rod so that opposite ends of the rod extend from opposite portions of the shell with a segment of the rod between the opposite portions being within the shell at a position to be gripped by the hand enclosed by the closed shell and (b) a strut connected to the rod segment in the mitt and the reel so that the reel is outside of the closed shell. The shell includes a finger positioned and constructed to (a) receive and enclose a digit of the hand while the hand is enclosed by the closed shell at the position where the hand grips the rod segment and (b) enable the digit therein to manipulate the bale. Hence, the sensitivity which experienced fishers desire is achieved because the hand directly grips the rod. The finger in the mitt enables the bale and line to be manipulated. The spinning reel and line thereon and the bale are all outside of the mitt for ease of manipulation.

BRIEF DESCRIPTION OF DRAWING

FIG. 2 is a side view of the glove and rod and reel combination of FIG. 1, from the side opposite to the side illustrated in FIG. 1;

FIG. 2A is a view of a cover employed in the glove illustrated in FIG. 1;

FIG. 3 is a top view of the glove illustrated in FIG. 1;

DESCRIPTION OF THE PREFERRED EMBODIMENT

Figure 1:
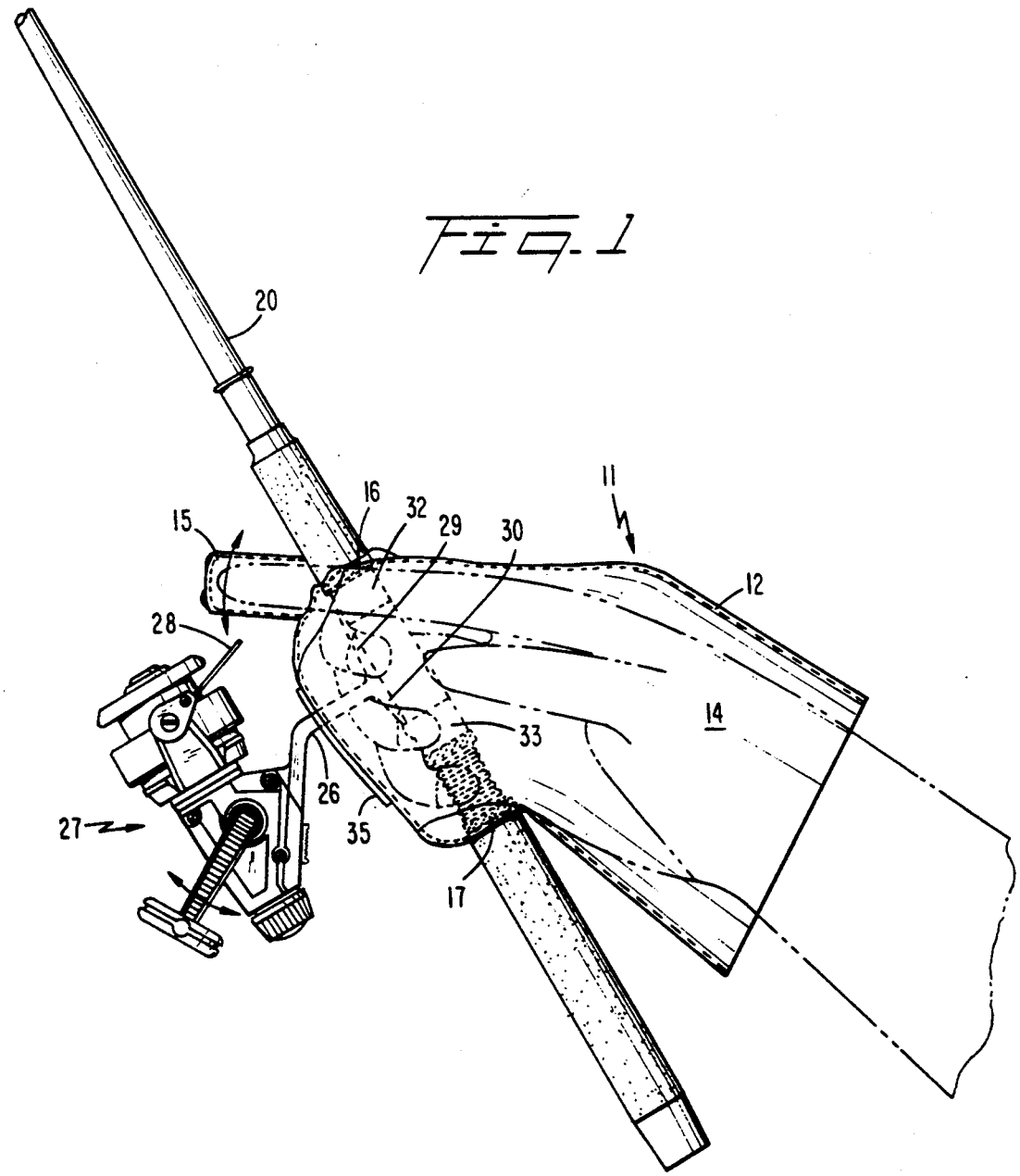
FIG. 1 is a side view of a glove in accordance with a preferred embodiment of the invention, wherein a hand is shown in phantom in the glove, and the glove and hand are gripping a fishing rod carrying a spinning reel.
Figure 4:
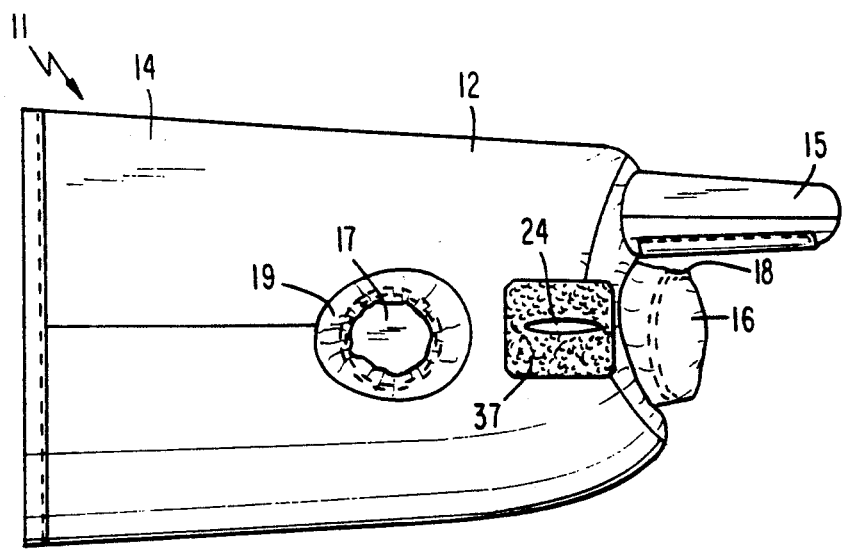
FIG. 4 is a bottom view of the glove illustrated in FIG. 1.
Figure 5:
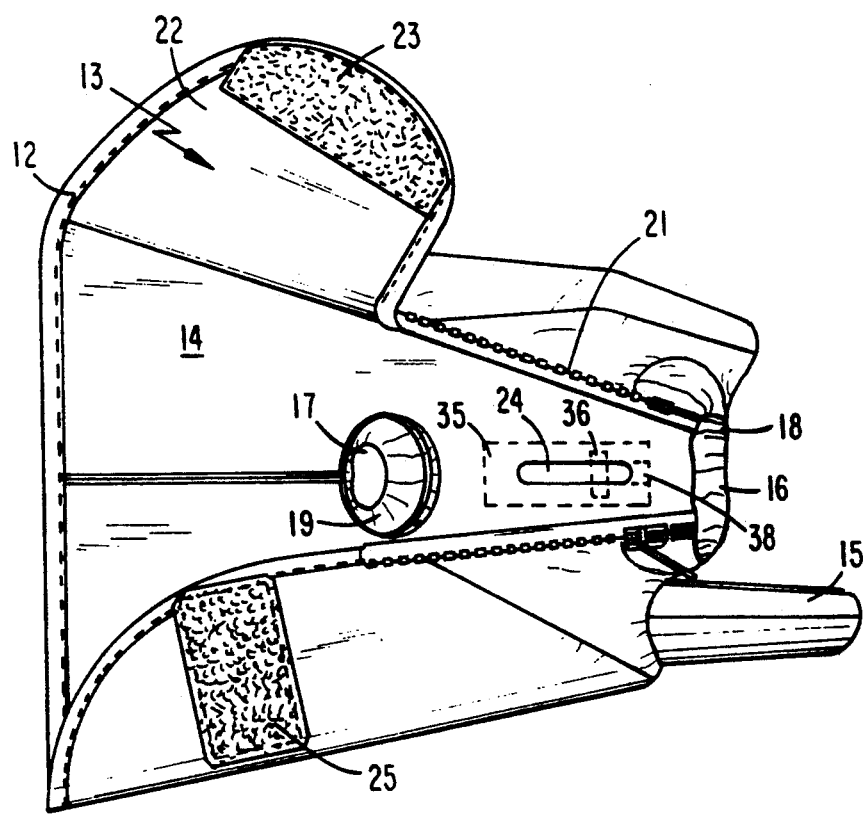
FIG. 5 is a view of the glove illustrated in FIG. 1 wherein a slide fastener (ZIPPER) included in the glove is open.

Reference is now made to the figures wherein mitt or glove 11, in accordance with a preferred embodiment of the present invention, is illustrated as including fabric (preferably nylon) exterior shell 12, having an interior thermal insulating lining 13 of suitable material, such as THINSULATE. Shell 12 includes main body portion 14 and single finger 15. During use, the wrist and entire hand, except the index finger, of the fisher are encircled by main body portion 14, while the index finger of the fisher is encircled by finger 15, as illustrated in FIGS. 1 and 2. Main body portion 14 includes aligned apertures 16 and 17 on the top and bottom portions thereof to enable fishing rod 20 to pass through mitt 11. Apertures 16 and 17 are respectively surrounded by padded gussets 18 and 19, which function similarly to elastic cuffs which prevent the circulation of air into or out of shell 12. Gussets 18 and 19 fit snugly around fishing rod 20 so that the exterior surface of the rod abuts against the gussets.

Main body portion 14 is selectively opened and closed along a line extending from aperture 16, at the forward end of mitt 11, to the rear of the mitt that encircles the arm of the fisher. To this end, slide fastener (ZIPPER) 21 extends from aperture 16 along the top surface of mitt 11, to a point approximately midway between aperture 16 and the back end of the mitt. The remainder of the opening is closed by flap 22, that extends across the opening to main body portion 14 on the opposite side of the opening. Flap 22 is selectively closed by hook and loop (VELCRO) fastening pads 23 and 25 respectively on the interior of the flap and the exterior of main body portion 14. This construction enables the hand of the fisher and the rod to be inserted into mitt 11 so that opposite portions of the rod extend from apertures 16 and 17, while permitting the hand to grasp the handle portion of the rod encircled by the mitt.

Mitt 11 includes slotted aperture 24, positioned between apertures 16 and 17, opposite from and extending in the same general direction as slide fastener 21. Aperture 24 is positioned and dimensioned to receive strut 26, which is part of spinning reel assembly 27, including bale 28 and oppositely directed fingers 29 and 30, selectively secured to rod 20 by rings 32 and 33 on the rod. Spinning reel assembly 27 is of a conventional type that is selectively removed from rod 20 by appropriate manipulation of rings 32 and 33 relative to fingers 29 and 30. Aperture 24 has a length sufficient to enable fingers 29 and 30 to be inserted through the aperture. Fingers 29 and 30 are attached to rod 20 by rings 32 and 33 by manipulation of the fingers and rings while slide fastener 21 is open. With fingers 29 and 30 held in situ on rod 20 by rings 32 and 33, strut 26 extends through aperture 24. Strut 26 has a cross-sectional area considerably less than the cross-sectional area of aperture 24. To keep the hand of the fisher warm it is, therefore, necessary to close aperture 24 while mitt 11 is in use.

To this end, while mitt 11 is being used aperture 24 is closed by cover 35, including slot 36 at right angles to slotted aperture 24. Slot 36 has a shape and size substantially equal to the shape and size of a cross-section of strut 26 so that the strut snugly fits in abutting relation against the interior edges of cover 35 defining slot 36. Slot 36 is located closer to one end of cover 35 than to the other end of the cover so that slot opening 38, extending at right angles to slot 36 from the slot to the cover edge has a short length. Slot 36 and opening 38 enable cover 35 to fit snugly around strut 26.

Cover 35 is selectively placed over the portion of shell 12 where aperture 24 is located by sewing hook and loop pad 37 onto shell 12 in the vicinity of aperture 24. Pad 37 includes an elongated slot that is aligned with and has the same length and geometry as aperture 24. Cover 35 includes, on the back face thereof, hook and loop material that engages the hook and loop material of pad 37.

In use, spinning reel assembly 27 is attached to rod 20 as described supra. With slide fastener 21 and flap 22 open, the fisher inserts his hand into mitt 11 to encircle rod 20 so that strut 26 extends between his middle and ring finger and his index finger goes into mitt finger 15, as illustrated in FIG. 1. With one of the fisher's hands (the right hand in the illustrated embodiment) in this position in mitt 11, slide fastener 21 and flap 22 are closed by the hand of the fisher. The right hand of the fisher is now encircled by mitt 11 and in contact with rod 20 so the fisher is able to react quickly and properly to tension exerted by a fish on the line and coupled to rod 20. In addition, the fisher is able to manipulate bale 28 with his index finger in mitt finger 15.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. A mitt for keeping a hand of a fisher warm while fishing with a rod and spinning reel having a bale comprising a shell, closure means for the shell for selectively opening and closing the shell, the shell when closed by the closure means having a size and shape to encircle the hand, the shell when closed by the closure means including openings for receiving (a) the rod so that opposite ends of the rod extend from opposite portions of the shell with a segment of the rod between the opposite portions being within the shell at a position to be gripped by the hand enclosed by the closed shell and (b) a strut connected to the segment and the reel so that the reel is outside of the closed shell; the shell including a finger positioned and constructed to (a) receive and enclose a digit of the hand while the hand is enclosed by the closed shell at the position where the hand grips the rod segment and (b) enable the digit therein to manipulate the bale.

2. The mitt of claim 1 wherein the strut is connected to a pair of oppositely extending fingers selectively mounted on the rod, the opening for the strut having a size enabling the fingers to be placed through the opening so the fingers can be mounted on the rod while the closure means is arranged to open the shell.

3. The mitt of claim 2 further including a cover for the opening for the strut, the cover including an aperture having an area and shape approximately the same as the area and shape of the strut so the cover aperture is aligned with the opening for the strut.

4. The mitt of claim 1 wherein the shell includes an opening closed by the closure means, the opening extending from one of the openings for the rod to an end of the shell opposite the finger.

5. The mitt of claim 1 wherein one of the openings for the rod is at one end of the shell, the finger being at the same end of the shell as said one of the openings.

6. The mitt of claim 5 wherein a second of the openings for the rod is in a mid portion of the shell between said one end of the shell and an opposite end of the shell through which the fisher's arm extends.

7. In combination, a fishing rod, a spinning reel having a bale mounted on the rod, a mitt for keeping a hand of a fisher warm while fishing with the rod and spinning reel, the mitt including a thermally insulated fabric shell, closure means for the shell for selectively opening and closing the shell, the shell when closed by the closure means having a size and shape to encircle the hand, the shell when closed by the closure means including openings for receiving (a) the rod so that opposite ends of the rod extend from opposite portions of the shell with a segment of the rod between the opposite portions being within the shell at a position to be gripped by the hand enclosed by the closed shell and (b) a strut connected to the segment and the reel so that the reel is outside of the closed shell; the shell including a finger positioned and constructed to (a) receive and enclose a digit of the hand while the hand is enclosed by the closed shell at the position where the hand grips the rod segment and (b) enable the digit therein to manipulate the bale.

8. The combination of claim 7 wherein the strut is connected to a pair of oppositely extending fingers selectively mounted on the rod, the opening for the strut having a size enabling the fingers to be placed through the opening so the fingers can be mounted on the rod while the closure means is arranged to open the shell.

9. The combination of claim 8 further including a cover for the opening for the strut, the cover including an aperture having an area and shape approximately the same as the area and shape of the strut so the cover aperture is aligned with the opening for the strut.

10. The combination of claim 7 wherein the shell includes an opening closed by the closure means, the opening extending from one of the openings for the rod to an end of the shell opposite the finger.

11. The combination of claim 7 wherein one of the openings for the rod is at one end of the shell, the finger being at the same end of the shell as said one of the openings.

12. The combination of claim 10 wherein a second of the openings for the rod is in a mid portion of the shell between said one end of the shell and an opposite end of the shell through which the fisher's arm extends.

* * * * *